United States Patent Office 3,397,368
Patented Aug. 13, 1968

3,397,368
CONTROL CURRENT SENSITIVE MODULATORS
Walter Emil Wilhelm Jacob, Stuvsta, Sweden, assignor to Telefonaktiebolaget L M Ericsson, Stockholm, Sweden, a corporation of Sweden
Filed July 27, 1965, Ser. No. 475,145
Claims priority, application Sweden, Aug. 12, 1964, 9,730/64
7 Claims. (Cl. 332—43)

ABSTRACT OF THE DISCLOSURE

There is disclosed a family of circuits which can be used for modulators. Each circuit includes a threshold device of semi-conductor material whose resistance is switchable between high and low values in accordance with the magnitude of a direct and/or slowly varying control current passing therethrough. A high frequency signal is applied to the device as is the control current. As the control current is varied the high frequency signal is modulated.

---

The present invention refers to an electric circuit which has a high frequency resistance in dependence on the magnitude of a slowly varying current and which has application, for example, as a modulator.

The invention makes use of a resistance device of the character described in the United States Patent 3,271,591.

According to the invention such an electric circuit comprises at least one resistance device of the character referred to, means for applying to the device a direct current and/or a slowly varying current appropriate for causing the device to assume a low ohmic state so as to exhibit a resistance which in a current-voltage characteristic for the device may be represented by a first line parallel with the current axis, and means for applying to the device a high frequency signal for which the device has a linear resistance which may be represented by a second line passing through the origin of the current-voltage characteristic, said second line also passing through a point in said first line corresponding to the value of direct current or momentary value of the slowly varying current, and thus having a slope varying in dependence on variation in the position of this point along said first line, whereby due to the linear resistance, as represented by the slope of said second line, of said device to said high frequency signal there will be different high frequency voltage drops across the device for a particular high frequency current, or different high frequency currents through the device for a particular high frequency voltage drop across it, in dependence on different values of said direct current or on different momentary values of said slowly varying current or a combination of both these values.

In order that the invention may be more fully understood reference will now be made by way of example to the accompanying drawings, in which.

Figure 1:
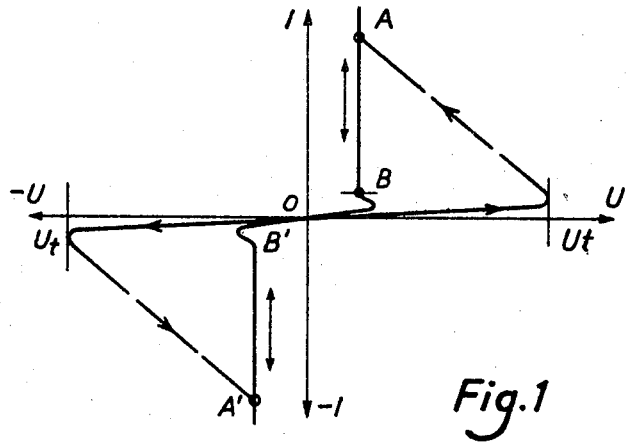
FIG. 1 shows a voltage-current characteristic for an electric resistance device used for the invention.

FIG. 1 shows the voltage-current characteristic of a coupling device, in the following called a threshold device, which is described in U.S. Patent 3,271,591. The threshold device utilized in the present invention has two different states, a high ohmic state and a low ohmic state. When a voltage is applied across the device only a small leakage current flows through it in accordance with the part O-U$t$ of the characteristic. When the breakdown voltage U$t$ is reached the current reaches a high value in accordance with point A of the characteristic. This may be explained by assuming that between the electrodes of the device a conducting channel is developed so that the semi-conducting layer of the threshold device is transformed from amorphous and high ohmic state to a liquid and low ohmic state. The area and therewith also the conductivity of the conducting channel vary proportionally with the current so that the voltage drop over the device is almost independent of the current value as appears from the voltage-current-characteristic. The current value of point A is in the main determined by a load resistance connected in series with the device. When decreasing the current to a critical value the "liquid" state of the current channel does no longer exist, the material resumes the amorphous structure and the device reverts to its high ohmic state represented by the O-U$t$ and O-(−U$t$) portions of the characteristic respectively.

Figure 2:
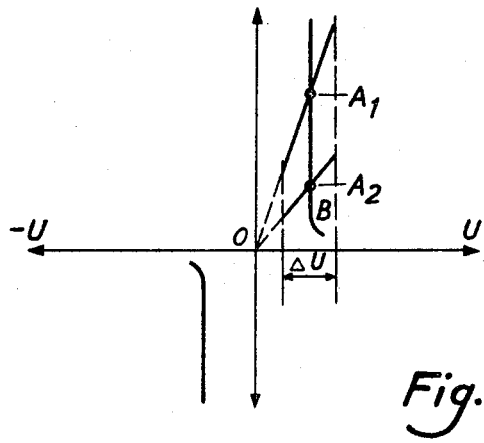
FIG. 2 shows high frequency current through the device as a function of applied voltage for different values of the low frequency current and maintained value of high frequency voltage.

FIG. 2 shows that the threshold device will have a nonnegligible resistance for an applied high frequency voltage, which resistance, however, is also dependent on the magnitude of the applied direct current or instanatneous value of a slowly varying current. This may be explained by the fact that the area of the current channel, which varies proportionally with the current, can follow the current variations as long as the period of the current changes is long in comparison with the thermal inertia of the device material but at a high frequency variation the area of the channel can no longer follow the current changes. At a high frequency the device thus appears as having a linear ohmic characteristic, which passes through the origin O and through a working point on the low ohmic part of the characteristic, which point varies in position in dependence on the instantaneous value of the direct current.

Thus, working points such as A$_1$ and A$_2$ respectively can be chosen to provide a lower or a higher high frequency resistance of the device. If thus the high frequency voltage U$_H$=$\Delta U$ across the device is held constant a choice of the working point A$_1$ will give a three times greater high frequency current than a choice of the working point A$_2$.

Figure 3:
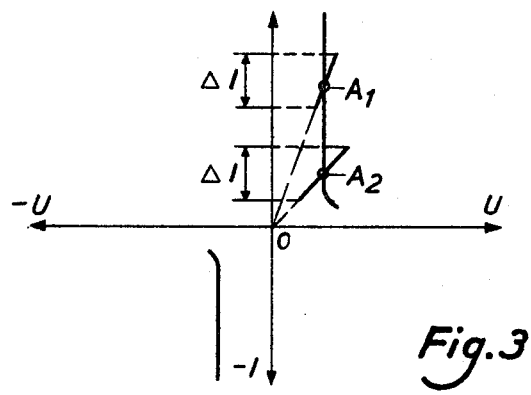
FIG. 3 shows high frequency voltage as a function of different values of low frequency current and maintained value of high frequency current through the device.

FIG. 3 shows in a corresponding way how the voltage drop across the device will vary for the same value $\Delta I$ passing through the device in dependence of the choice of the operating point A$_1$ and A$_2$ respectively as determined by the direct current. For the same current value the voltage drop will be about three times greater with the choice of point A$_2$ than with the choice of point A$_1$.

The same conditions are valid for the case when a low frequency current is used instead of a direct current, together with the high frequency signal. As long as the variations of the low frequency current do not exceed a certain value the operating point will be moved along the vertical line and, due to the applied high frequency signal, there will at the same time be a resistance characteristic which passes the operating points defined by the low frequency current. This property may be made use of to construct a high frequency modulator. Between the low frequency voltage and the high frequency voltage there is a region where the device does not have apparently the one or the other property and therefore the frequency of the high frequency signal must of course be chosen outside this region.

Figure 4:
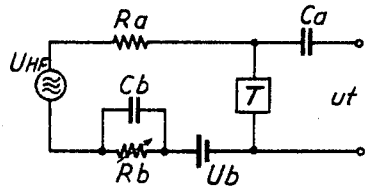
FIGS. 4–11 show respective different embodiments of the invention.
Figure 5:
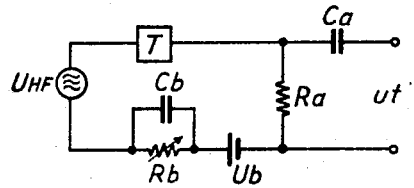
Figure 6:
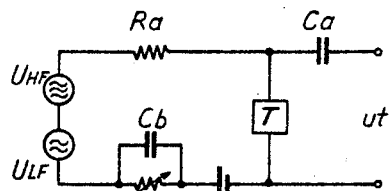
Figure 7:
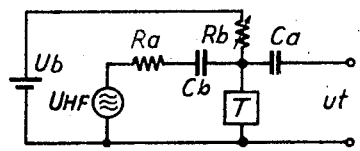
Figure 8:
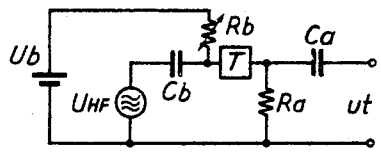

FIGS. 4 and 5 show circuits for varying the high frequency output voltage. In both figures the threshold device T is connected to a battery $Ub$ via a load resistance $Ra$ and a variable resistance $Rb$. The circuit also comprises a source of high frequency signal UHF. The variable resistance $Rb$ is connected in parallel with a capacitor $Cb$ which conducts only the high frequency signal. The only difference between FIG. 4 and FIG. 5 is that in FIG. 4 the high frequency output signal $ut$ is developed across the threshold device T, the magnitude of the signal being inversely proportional to the direct current. In the circuit in FIG. 5 the high frequency signal is developed across the resistance $Ra$, the voltage of the signal being directly proportional to the direct current passing the threshod device T. The capacitor $Ca$ is a low frequency blocking capacitor. In these and subsequent figures those elements having the same functions have the same reference characters. FIG. 6 shows a circuit in which a source for low frequency voltage ULF is connected in series with the threshold device T, the load resistance $Ra$ and the source for the high frequency signal UHF. The high frequency voltage drop across the device T is the output signal and will vary in time with the low frequency signal of source ULF but will have an inverse amplitude. FIG. 7 differs from the circuit according to FIG. 6 in that the threshold device T and the high frequency voltage source UHF are connected in parallel with the direct current source $Ub$. FIG. 8 shows a circuit in which the threshold device T and the source of the high frequency signal UHF are connected in parallel to the source of direct current $Ub$. The output signal is developed across the load resistance $Ra$, the signal voltage being proportional to the current passing the threshold device T.

Figure 9:
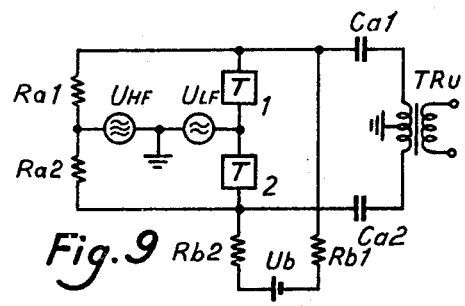

FIG. 9 shows a high freqeuncy modulating circuit of the balanced type, comprising two threshold devices $T_1$ and $T_2$, which are connected in series via resistors $Rb1$ and $Rb2$ to a direct current source $Ub$. In addition devices $T_1$ and $T_2$ are connected via resistors $Ra1$ and $Ra2$ in parallel to a source of a low frequency current ULF and a high frequency current UHF connected in series. The output signal, which is developed across the output transformer $TRu$ corresponds to the difference of the high frequency voltage drop across the two threshold devices $T_1$ and $T_2$ connected in series. The high frequency output signal is zero every time the low frequency signal passes a zero value. Thus the embodiment of FIG. 9 is a high frequency modulator with suppressed carrier.

Figure 10:
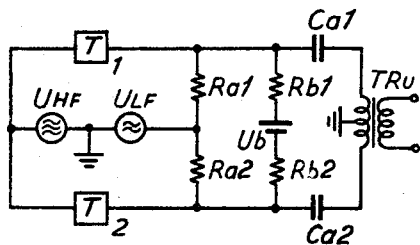

The embodiment of FIG. 10 differs from that of FIG. 9 in that the output signal is developed across the resistance $Ra1$ and $Ra2$ connected in series. The output signal is in counter phase compared with the circuit in FIG. 9.

Figure 11:
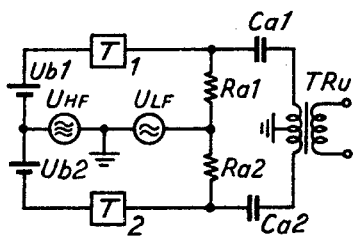

The embodiment of FIG. 11 differs from those of FIGS. 9 and 10 in that the threshold devices $T_1$ and $T_2$ are in series with their own direct current sources $Ub1$ and $Ub2$ respectively and parallelly connected to the high frequency source UHF and the low frequency source ULF. The output signal is across the load resistances $Ra1$, $Ra2$ of the devices, which resistances are connected in series.

What is claimed is:

1. An electric circuit which can exhibit a high frequency resistance varying in dependence on the magnitude of a direct current and/or a slowly varying current, which circuit comprises at least one threshold means of semi-conductor material which is switchable between an amorphous and a high ohmic state and a fluid and low ohmic state, said threshold means having a pair of terminals, means for applying to said threshold means a modulating current having no greater than a low frequency appropriate for causing said threshold means to assume the low ohmic state so as to exhibit a resistance which in a current-voltage characteristic for the device is representable by a first line parallel with the current axis of the characteristic, and means for applying to said threshold means a high frequency signal for which said threshold means has a linear resistance which is representable by a second line passing through the origin of the current-voltage characteristic, said second line also passing through an operating point in said first line corresponding to the value of the modulating current, and thus having a slope varying in dependence on variation in the position of said operating point along said first line, whereby due to the linear resistance, as represented by the slope of said second line, of said threshold means to said high frequency signal there will be different high frequency voltage drops across said threshold means for a particular high frequency current through said threshold means for a particular high frequency voltage drop across it, in dependence on different values of said modulating current.

2. An electric circuit according to claim 1, wherein said means for applying said modulating current comprises a direct current source connected in series with a variable resistance both of which are connected in series with said means for applying high frequency signals across said pair of terminals of said threshold means.

3. An electric circuit according to claim 1 wherein said means for applying modulating current comprises a source of direct current and a source of slowly varying current and means for connecting both said sources and said means for applying high frequency signals in series across said pair of terminals of said threshold means.

4. An electric circuit according to claim 1, wherein said means for applying a modulating current comprises a direct current source connected in series with a variable resistance and means for connecting said source and said resistance in series across said pair of terminals of said threshold means in parallel with a source of high frequency signals.

5. An electric circuit according to claim 1, having output terminals at which a resultant high frequency signal is produced connected respectively to said pair of terminals of said threshold means.

6. An electric circuit according to claim 1 having output terminals at which a resultant high frequency signal is produced and further comprising a resistance, connected to said output terminals, through which current through said threshold means passes.

7. An electric circuit according to claim 1, wherein said threshold means comprises two threshold devices connected in series with each other, said means for applying a modulating current comprises a source of direct current and a source of slowly varying current and said means for applying a high frequency signal comprises a source of high frequency signals, means for connecting said source of slowly varying current and said source of high frequency signals in series, means for connecting said threshold devices in series with said source of direct current and in parallel with the serially connected source of slowly varying current and said source of high frequency signals, and two output terminals at which a resultant high frequency output signal is produced being connected at opposite ends of the series connection of the two threshold devices.

References Cited

UNITED STATES PATENTS

| 2,152,016 | 3/1939 | Baesecke et al. | 332—43 |
| 2,657,360 | 10/1953 | Wallace | 332—52 |
| 3,101,452 | 8/1963 | Holcomb et al. | 330—10 |
| 3,196,370 | 7/1965 | Rabinovici et al. | 332—44 |
| 3,284,712 | 11/1966 | Hobrough | 325—105 |

MILTON O. HIRSHFIELD, *Primary Examiner.*

W. E. RAY, *Assistant Examiner.*